United States Patent Office 2,947,796
Patented Aug. 2, 1960

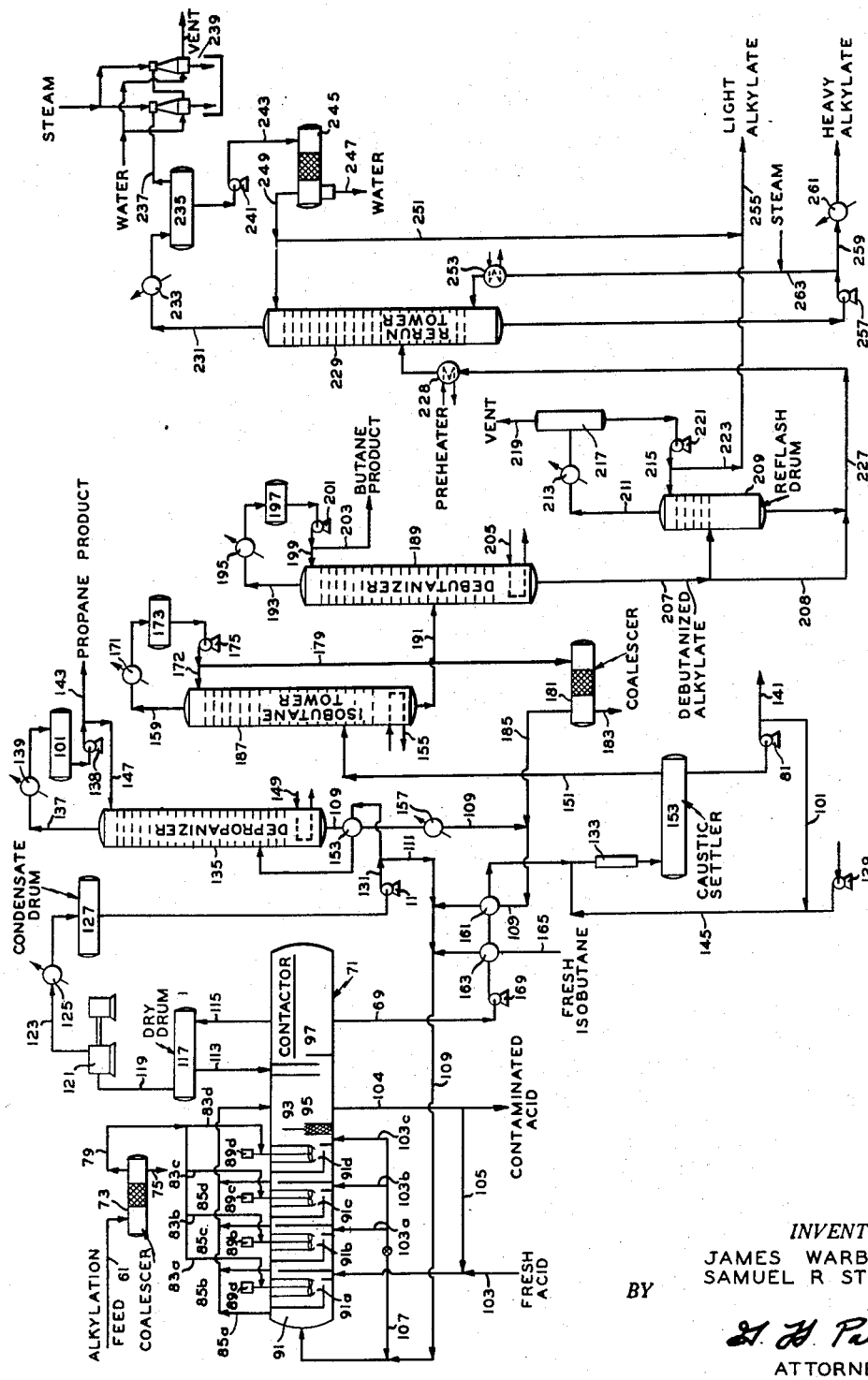

2,947,796

ALKYLATION OF HYDROCARBONS

James Warburton, Alamo, Calif., and Samuel R. Stiles, Cresskill, N.J., assignors to The M. W. Kellogg Company, Jersey City, N.J., a corporation of Delaware Filed Aug. 22, 1958, Ser. No. 757,177

11 Claims. (Cl. 260—683.62)

This invention relates to an alkylation process and more particularly to the alkylation of isoparaffins with olefins in the presence of an acid catalyst to produce hydrocarbon compounds boiling in the gasoline range. Still more particularly, it relates to a method of decreasing fouling of alkylation process equipment.

This application is a continuation-in-part of application Serial No. 488,264, filed February 15, 1955, now abandoned.

In an alkylation process employing sulfuric acid as a catalyst in the reaction between an olefin and an isoparaffin, it is the present belief that sulfuric acid catalyst reacts with the olefin to form an alkyl acid sulfate, which in turn reacts with the isoparaffin to form a higher boiling paraffin of the gasoline range, with the sulfuric acid molecules being released for further catalytic action. Although, in the alkylation reactions the majority of contacts between the acid, isoparaffin and olefin result in the production of higher boiling alkylate, in some cases the acid ester molecule does not come in contact with an isoparaffin molecule and the acid esters leave the reaction zone in the alkylate product mixture. In other instances, the acid ester molecules react with olefins to form polymers and free acid or to form neutral esters or sulfates. These contaminants are also carried over into the alkylate product mixture.

The polymers in the alkylation contactor effluent are primarily high molecular weight, high boiling compounds with relatively low octane numbers and are, therefore, unsatisfactory as a blending material in the production of high octane gasolines. The acid and neutral esters are relatively high boiling materials and they too are lower in quality than the alkylate as a whole. Under sufficiently high temperature, both the acid and neutral esters decompose with the evolution of sulfur dioxide and the formation of heavy polymer type materials. These heavy polymer materials are also unstable and with still higher temperatures, additional decomposition takes place which results in the deposition of carbonaceous materials. At these higher temperatures, at least some of the olefin polymers formed in the alkylation zone also decompose, contributing to the carbonaceous deposits.

Various methods have been employed to remove or inhibit the deposition of acid sulfates, sulfates and polymers in the alkylate stream. Of the methods employed, the most well known include increased mixing velocity to avoid acid sulfate and olefin reaction, formation of acid-isoparaffin emulsion prior to olefin introduction, proper adjustment of temperature and pressure, high acid concentration and high molar excess of isoparaffin in the reactor. These methods have provided an increase in the yield of alkylate product and a decrease in the yield of the contaminating by-products. However, in spite of these precautions, the entrainment of sulfate and polymer in the alkylate is still relatively high and alkylate removed from the reaction zone is still degraded. Further measures are provided for removal of these contaminants from the hydrocarbon alkylate phase to the extent that the degradation of the alkylate is negligible. The methods used to accomplish this result include settling, centrifuging, passing the alkylate through coalescers, etc. In addition to this separation step, it has been found beneficial to wash the alkylate product effluent first with a caustic solution and then with water to remove the neutralized acid esters, sulfates and polymers in the alkylate stream so that only trace amounts of the impurities remain. This step provides for the subsequent production of an alkylate product which meets commercial specifications.

The alkylate product is usually produced in light and heavy fractions. It is in the separation of these fractions that a further problem is encountered, namely, clogging of the separation equipment resulting in failure. This difficulty is attributed to concentrating the trace amounts of acid sulfates, sulfates and polymers which remain in the alkylate stream. While these amounts are so small that they do not substantially effect the octane rating of the alkylate, they are, nevertheless, sufficient to cause fouling in the alkylate fractionation equipment so that the equipment is inoperative after from ten days to two weeks of operation.

It is an object of this invention to provide an improved process for the alkylation of hydrocarbons in the presence of an acid catalyst.

It is another object of this invention to decrease the decomposition of ester and polymer contaminants present in the reaction product from the alkylation of isoparaffins with olefins in the presence of sulfuric acid.

Still another object of this invention is to increase the yield of alkylate produced in the alkylation of isoparaffins with olefins in the presence of sulfuric acid.

Still another object of this invention is to decrease the decomposition of ester and polymer contaminants in the separation of light and heavy alkylate produced from the alkylation of isoparaffins with olefins in the presence of sulfuric acid.

These and other objects of the invention will become more apparent from the following detailed description and discussion.

In carrying out this invention contaminated effluent from an alkylation reaction is separated into a hydrocarbon and an acid phase. The hydrocarbon phase is removed and subjected to treatment for removal of sulfate and polymer contaminants and the resulting purified material is treated for removal of the unreacted isoparaffin and normal paraffin present in the feed. The pressure and temperature of the treated alkylate stream is then reduced so that subsequent distillation into light and heavy alkylate fractions is carried out at a relatively low temperature under vacuum.

In the commercial alkylation of low boiling isoparaffins with olefins, it is customary to utilize feed stocks varying widely in composition and containing a large variety of saturated and unsaturated compounds. For example, either cracked or straight run refinery gases which are a prime source of alkylation feed stocks may contain paraffins having from 1 to 6 carbon atoms, isoparaffins including isobutane, isopentane and others of higher molecular weight and numerous low boiling olefins and their isomers. It is within the scope of this invention to use feed stocks containing these and higher boiling compounds in widely varying proportions.

In discussing the application of this invention it is desirable to consider a specific alkylation reaction. For this reason and because of its widespread use, the subsequent discussion is directed to the reaction of isobutane with butylene in the presence of sulfuric acid. This, however, is not to be construed in any way as limiting the scope of the invention, and other alkylation systems involving the reaction of an olefin with an isoparaffin, such as, for example, the reaction of propene with isopentane, propene with isobutane, etc., are also included.

The sulfuric acid alkylation of isobutane with butylene is preferably conducted in several stages and at a temperature between about 0° F. and about 100° F. The pressure in the reaction zone is maintained at a level sufficient to keep the reactants in a liquid state, usually between about atmospheric and about 100 p.s.i.g. In order to obtain a high quality alkylate it is desirable to maintain a high isobutane to olefin ratio in the feed to the reaction stages, preferably between about 2 and about 40 mols per mol and it is necessary to keep the acid catalyst strength above 80 percent, and preferably above 90 percent. Sufficient acid concentration to promote the alkylation reaction is provided by maintaining an olefin to acid ratio in each reaction stage of between about 0.25 and about 15 volume olefin per hour per volume acid.

In a typical application of this invention isobutane and sulfuric acid are introduced into an alkylation reaction zone and are violently agitated to form an emulsion, this being the preferred method of assuring intimate contact between the acid catalyst and the hydrocarbon to be alkylated. The major portion of the isobutane feed is provided by a recycle stream obtained from subsequent distillation steps. Any additional quantity of isobutane required, for example, that amount needed to start up the unit is usually supplied from an independent source. The mixing and agitation required in the contact zone may be provided in a number of ways; however, usually a conventional mixer or pump provides a means for creating and moving the emulsion at high velocity and also for circulating the emulsion in the contact zone. The reaction may be carried out in one stage, although more usually several stages in series are provided with a portion of the olefin reactant being admitted to each stage and contacting isobutane passing serially through the successive stages. The alkylation feed, which contains the olefin reactant, also contains isobutane, butane, propane, isopentane, pentane, and frequently small quantities of lighter paraffins. The temperature in the reaction zone is maintained at a constant low level by vaporizing therefrom the lighter components in the reaction products, more usually, a mixture of butane, isobutane, propane and any lower boiling compounds. The vapors are compressed and condensed and the condensate, after the removal of propane and lighter components, is returned to the alkylation reaction zone in the isobutane recycle.

Effluent from the last contactor reaction section is passed to a separation zone wherein contaminated acid containing polymers, sulfates and acid sulfates is separated from the hydrocarbons. A portion of the contaminated acid containing active catalyst is recycled to the contactor and the remainder is either processed to remove contaminates and reused, or is used in a treating process wherein a high degree of acid purity is not required or is discarded. Generally, the recycled contaminated acid is combined with fresh acid before being admitted to the contactor.

The material remaining after separation of the acid comprises a mixture of alkylate, unconverted isobutane, low boiling paraffins, and some butylene polymers, acid sulfates and sulfates. This mixture is removed from the alkylation contactor, caustic washed to remove entrained acid and sulfates, and passed through a series of distillation steps for the separation of low boiling components, primarily isobutane and normal butane. Although the temperature existing in the distillation steps is relatively high, particularly in the removal of normal butane, the amount of ester and polymer decomposition which takes place is small since only a trace amount of these contaminants is present after the washing step, and the concentration of these contaminants at these stages of the alkylation process is extremely low. The concentration is so low, in fact, that the quality of the alkylate, if used as a fuel after debutanization, without further treatment, is not noticeably degraded. Should the concentration of these contaminants be excessive, due to failure of sufficient settling or omission of the caustic wash, it is possible to remove the deleterious effect of sulfur constituents by redistilling the deisobutanized alkylate below a certain temperature by the use of steam or vacuum. This procedure is not necessary under normal conditions in the operation of the presently described process.

Generally, the debutanized alkylate is not of sufficient high quality to serve as a major component of high octane gasoline. In order to provide a more suitable material for blending, the alkylate is separated by distillation into two fractions, namely, a heavy and a light alkylate fraction. As the volume of the liquid containing alkylate diminishes by the removal of isobutane and normal butane, the concentration of the contaminants in the alkylate increases. Even though the amount of acid sulfate, sulfate and polymer contaminants present is not sufficient to make the alkylate commercially undesirable or unacceptable, the concentrating effect is sufficient to cause clogging of the distillation equipment. Regardless of whether or not prior distillation to remove sulfur compounds has been employed, fouling of the equipment is still observed, indicating that trace amounts of these contaminants are still passed along in the liquid containing the alkylate product.

Heretofore, the fouling effect was, in some measure, overcome by the addition of inhibitors, such as diethyl amine, to the alkylate prior to distillation or fractionation. Another measure employed to circumvent this difficulty involves the use of a second reboiler which is operated alternately with the first so that one may be cleaned while the other is in operation. Still another method teaches the introduction of ammonia into the alkylate to neutralize the acidic components. Still other operations have allowed fouling to take place, withdrawing as much light alkylate overhead as possible before equipment failure; however, it is obvious that this results in great losses of valuable material.

Surprisingly, it has been discovered by the process of the present invention that the expensive and inadequate methods discussed above can be obviated by operating the distillation within certain critical pressure limitations. Thus, it has been unexpectedly discovered that by reducing the pressure and the temperature, at this particular stage in the process, that is, after debutanization, and prior to distillation, the above difficulty is avoided. Performing the pressure and temperature reduction step between the debutanization and distillation steps is critical in effecting this improvement and temperature and pressure reduction at any other stage of the process fails to avoid fouling of the distillation apparatus. Accordingly, in the method of this invention, the separation is carried out under vacuum and at a low temperature in order to avoid decomposition of the aforementioned contaminants which are more highly concentrated in the alkylate than at any other point in the alkylation process. In carrying out the separation, the system is maintained at a pressure of between about 1 and about 14 p.s.i.a., and more usually between about 5 and about 10 p.s.i.a. To effect the separation of light alkylate at these pressures, a maximum temperature not in excess of the range of between about 260° F and about 320° F. is generally required. It is, of course, understood that the temperature and pressure employed in the separation are dependent on the concentration of contaminants in the heavy alkylate and in the total alkylate.

As mentioned previously, it is probable that contaminant decomposition has as its source both esters and olefin polymers, particularly the higher molecular weight polymers. Unfortunately, it is difficult to ascertain the concentration of olefin polymers in alkylate and even more difficult to determine their distribution according to molecular weight. It is not feasible, therefore, at the present time, to correlate olefin polymer concentration with the degree of fouling encountered in process equipment. Fortunately, however, just the opposite is true with respect to esters. The concentration of esters in the alkylate definitely serves as an indicator of fouling. The concentration of these esters in the heavy alkylate fraction after separation of the light alkylate fraction is more easily determined than in the total debutanized alkylate, since the major portion of the alkylate is removed as the light fraction and the esters remain in the heavy fraction where their concentration is increased. It has been discovered that when esters are present in the heavy alkylate in a concentration of about 0.4 weight percent, heating this material to elevated temperatures results in the evolution of $SO_2$ and extensive fouling through deposition of carbonaceous materials. As the concentration is varied below and above this amount, the degree of fouling and the rapidity of $SO_2$ evolution decrease and increase accordingly. It has not been possible, however, in these experiments to account for the extent of fouling merely on the basis of ester concentration, which is always quite small even when fouling is extreme. This would seem to bear out the above theory concerning olefin polymer decomposition. Thus, although it is possible to use the concentration of esters in alkylate hereinafter as a measure of fouling tendency, it is not intended that this be construed in a limiting sense, but that contaminant decomposition to produce fouling shall include the decomposition of olefin polymers.

The concentration of esters in the total alkylate is usually between about 0.001 and about 0.1 percent by weight and the concentration of these materials in the heavy alkylate varies between about .01 and about 1.0 percent, depending on the efficiency of separation and the ratio of light to heavy alkylate. When the concentration of contaminants in the heavy alkylate is high, it is preferred to operate in the lower regions of the temperature and pressure ranges previously mentioned. On the other hand, when the contaminants in the heavy alkylate are small in quantity, operation at higher temperatures and pressures is allowable. In the usual commercial alkylation process, the ratio of light to heavy alkylate produced is between about 5 and about 30 to 1 by volume and, under these conditions, it is preferred that the temperature does not exceed about 320° F.

The pressure of the alkylate product leaving the debutanizer at a pressure usually not less than 40 p.s.i.g., is lowered to between about 1 and about 14 p.s.i.a. by any convenient means such as, for example, a pressure reduction valve, preflashing, etc. In the most preferred embodiment of the present process, a preflash drum is installed between the debutanizer and the distillation apparatus and a portion of the light fraction of the alkylate product is separated overhead from the heavy alkylate fraction and the remaining portion of light alkylate. This remaining portion of light alkylate and heavy alkylate is then passed to the distillation tower for additional separation of light alkylate. The employment of the preflash drum has two main advantages, namely, it provides an inexpensive means for reducing pressure before entry into the distillation apparatus and, by partial removal of light alkylate, it reduces the quantity of material treated in, and thereby reduces the size of, the distillation tower.

The method of operation provided by this invention has several important advantages. By decreasing ester and polymer decomposition it eliminates a maintenance problem of long standing which, in commercial units, has resulted in many hours of lost production in addition to conventional maintenance expense. A secondary effect of the invention is to provide an increase in total alkylate yield, more specifically heavy alkylate yield. This, of course, is accomplished with no decrease in light alkylate production. Although the heavy alkylate is not of as good quality as the light alkylate, it still has a high octane rating as compared to other refinery stocks and, because of its relatively small quantity, it is easily blended in lower octane gasolines. Thus, this invention in effect provides an increase in refinery blended gasoline yield.

In order to more clearly illustrate the invention and to provide a better understanding thereof, reference is had to the attached drawing which is a diagrammatic illustration of a process equipment arrangement used in one embodiment of this invention. Referring to the drawing, the alkylation reactions are carried out in a cylindrical elongated contacting vessel 71. The interior of approximately ⅔ of the contactor is divided into a number of separate reaction stages or sections 91a, 91b, 91c and 91d by transverse baffles so arranged that liquid entering the end of the contactor passes from an inlet chamber 91 upward through the first section 91a over a baffle down to the bottom of the second section 91b, then upward through the second section over a second baffle and in a similar manner through the third and fourth sections 91c and 91d. Each section contains a mixer 89a, 89b, 89c and 89d respectively, in this specific illustration, propeller-type submersible pumps disposed vertically with the drivers located in the lower portion of each reaction section. Each pump is so constructed that material entering the section is forced upward within the casing into the corresponding section. The capacity of each pump is such that the quantity of materials circulated through the pump is several times greater than the total liquid flow entering the section in which the pump is located. By this method of operation, it is possible, for example, to provide an isobutane to butylene ratio of more than 200 to 1 in the mixers with a feed ratio to each reaction section of only 20 to 1.

The alkylation reactants and catalyst enter the contactor 71 at two different points. The alkylation feed comprising a mixture of propane, butane, isobutane and butylene is split into four streams which enter the mixing pumps 89a, 89b, 89c and 89d through conduits 83a, 83b, 83c and 83d respectively. This material passes downward within each pump through a hollow sleeve surrounding the pump shaft and is admitted to the liquid stream flowing through the pump downstream of the pump impeller. A mixture of butane and isobutane made up of compressor condensate material, wet isobutane separated from the contactor effluent in the isobutane tower, and fresh isobutane, is admitted to the inlet chamber 91 of the contactor through conduit 109. Before this, however, the acid catalyst comprising fresh acid or a mixture of fresh acid and contaminated acid in an amount sufficient to provide an acid to olefin ratio of about 4 volumes acid per volume per hour of olefins in each reaction section is combined with the isobutane recycle through conduit 107 in order to absorb the water in this stream. As illustrated, if desired, a portion of the acid may alternately be introduced into all or any of the reaction sections through conduits 103, 103a, 103b, and 103c. Hydrocarbon passing from the inlet chamber 91 into the first reaction section 91a is combined with the acid and the mixture enters the section of the pump 89a where it is picked up, emulsified and directed upward within the pump casing at a high velocity. The alkylation feed from conduits 83a is admitted to the emulsion downstream of the pump impeller and the alkylation reaction proceeds immediately and is substantially completed before the reactants leave the pump casing. As mentioned previously, the capacity of pump 89a is sufficiently great to assure a circulation rate several times as large as the flow of alkylation feed, isobutane and acid into section 91a; thus unreacted isobutane is circulated along with the acid catalyst and a portion of the alkylation product through the pump a number of times before it passes into the next section, where another portion is reacted with fresh alkylation feed. The same procedure is repeated in sections 91c and 91d.

Simultaneous with the alkylation reaction, quantities of neutral and acid esters and butylene polymers are formed, presumably according to the reactions previously given. Some of these materials, as illustrated, are relatively simple in structure; however, the majority of them are much more complex and have molecular weights substantially higher than the deirable compounds formed in the alkylation reaction.

The mixture of isobutane, alkylate, ester and polymer contaminants and acid leaving the last section passes through an emulsion breaking zone 95 formed by parallel transverse baffles and containing a conventional inert packing material. All of the effluent from the last section is forced to flow through this zone by a deflector baffle 93 extending above the liquid level within the contactor and downward within the emulsion breaking zone. Subsequent to this zone the acid separates from the hydrocarbon oil and is contained in a settling zone enclosed by baffle 97 over which alkylate and unreacted isobutane flow into the remainder of the contactor. The separated acid containing some polymers and esters passes from the contactor 71 through conduit 104. A portion of this acid is combined with fresh acid through conduit 105 and the mixture is added to the recycle isobutane through conduit 107 as previously described. The remainder of the acid is passed from the unit for further disposition (not shown).

The alkylation contactor 71 is maintained at a temperature of about 35° F. and at a pressure of about 6.0 p.s.i.g. The alkylation reaction is highly exothermic and it is necessary to provide a method of cooling the contactor to remove the heat of reaction and the sensible heat in the feed streams and thereby maintain the reaction sections at this low temperature. In this specific illustration, the cooling is accomplished by autorefrigeration of the reactants and reaction products. In carrying out this process, vapors comprising a mixture of isobutane, butane and propane are withdraw from the contactor through conduit 113 into a dry drum 117. Any materials settling in the dry drum are returned to the contactor settling zone beneath the acid level through conduit 113. The dry gas enters the suction of the compressor 121 through conduit 119, is compressed, discharged through conduit 123, condensed in a conventional water cooler 125 and passed to a condensate drum 127. It is withdrawn from the condensate drum and divided into two parts, with a portion being sent to the depropanizer 135 and the remainder being returned to the contactor 71 with fresh isobutane and isobutane recycle. It is desirable to proportion the condensed compressor effluent stream so as to maintain a controlled concentration of light materials in the contactor. By this means it is possible to obtain the desired contactor temperature with a reasonable compressor suction pressure. A substantial amount of the vaporization which occurs in the contactor 71 takes place in the entrance chamber 91 and the reaction sections 91a, 91b, 91c and 91d. The isobutane recycle stream enters the contactor as a liquid and at a higher temperature and pressure than exists within the contactor, i.e., about 50° F. and about 40 p.s.i.g. As a result, a portion of this stream flashes in the entrance chamber 91. To prevent a mixture of vapor and liquid from passing into the suction of pump 89a, an outlet for this gaseous material is provided through conduit 85a. A similar situation prevails in each of the reactance sections. In order to remove the reaction heat from each section, it is necessary that a further amount of light material be vaporized therein. This material is supplied primarily in the alkylation feed from conduits 83a, 83b, 83c and 83d, which feed is also introduced at a temperature and pressure, about 50° F. and about 40 p.s.i.g., substantially higher than exist in the contactor. The vapor so formed is removed from the reaction sections through conduits 85a, 85b, 85c and 85d, is combined with the vapor from conduit 85a, passes into the upper portion of the contactor downstream of the last reaction section and is withdrawn from the contactor through conduit 115. By this method of operation, it is possible to maintain a relatively constant temperature throughout the contactor 71.

The condensed compressor effluent from condensate drum 127 passes through pump 11 and is discharged through conduit 131 with a portion being separated through conduit 111 and joining the wet isobutane recycle through conduit 109, as previously described, and the remainder passing through a heat exchanger 153 countercurrent to the depropanizer bottoms and then into the depropanizer 135. Propane is taken overhead from the depropanizer through conduit 137, condensed in a conventional condenser 139 and discharged into accumulator 101. Accumulator liquid is then discharged through pump 138 with a portion being sent to the depropanizer as reflux and the remainder leaving the unit through conduit 143 as propane product. Heat is supplied to the depropanizer by a conventional reboiler 149 or other conventional heat source. The bottoms comprising primarily isobutane with some butane pass from the bottom of the depropanizer through conduit 109, give up a portion of their heat in exchanger 153 to the depropanizer feed and pass through a conventional water cooler 157 where the temperature is lowered still further. The cool isobutane is combined with wet isobutane from conduit 185 and the mixture is exchanged still again in exchanger 161 with cold effluent from the contactor 71. The combined stream is then further combined with fresh isobutane from conduit 165, which is also exchanged with contactor effluent in exchanger 163, and the total isobutane stream is mixed with acid and admitted to the reactor as previously described.

The alkylation products and unreacted alkylation feed, after separation from the spent acid in the contactor 71, pass through conduit 69, pump 169 and exchanger 163 and 161 previously mentioned. The warmer hydrocarbon mixture is combined with caustic discharged from pump 129 through conduit 145 and the combined stream passes through a mixer 133 into a caustic settler 153 wherein acid and acidic material carried over from the contactor is neutralized. The caustic wash also serves to saponify a portion of the ester contaminants. Neutralized caustic is removed from the settler by pump 81 with a portion being recycled to the mixer 133 through conduit 101 and the remainder being discharged from the unit through conduit 141. Saponified esters are removed by contacting the effluent with water wash (not shown). The acid-free contactor effluent is passed through conduit 151 into the isobutane tower 187 from which isobutane is removed overhead through conduit 159, condensed in condenser 171 and collected in accumulator 173. A portion of the condensed material is returned through pump 175 and conduit 172 to the isobutane tower as reflux. The remainder is discharged through conduit 179, passes through a water coalescer 181 wherein free suspended water is removed, is combined through conduit 185 with the depropanizer bottoms and returned to the contactor as recycle. Water separated from this stream is removed from the coalescer through conduit 183. The heat required to vaporize the isobutane in tower 187 is supplied by conventional reboiler 155. The bottoms from the isobutane tower comprising a mixture of butane, esters and polymer contaminants and alkylate pass through conduit 191 to a debutanizer 189 also heated by a conventional reboiler 205. Butane vapor is removed overhead from this tower through conduit 193, is condensed in condenser 195 and passes into accumulator 197. Debutanizer reflux is provided from accumulator liquid discharged from pump 201 through conduit 199. The remainder of the condensed overhead is discharged through conduit 203 as butane product.

Up to this point in the process, the operating conditions and contaminant concentrations are such that there is no appreciable decomposition of ester and polymer contaminants to carbonaceous materials. The most extreme conditions are encountered in the debutanizer wherein butane is separated from the alkylate. The temperature in the bottom of this tower normally exceeds 300° F.; however, it is not above the safe level of operation because the contaminants are sufficiently diluted in the bottoms liquid to prevent decomposition and fouling. In this specific operation, the ester concentration at this point is about 0.02 pound per 100 pounds of hydrocarbon.

Alkylate from the debutanizer passes through conduit 207 and enters a preflash drum 209 wherein a portion of the lower boiling components of this stream are flashed overhead. This net overhead material forms a part of what is conventionally known as "light alkylate" and amounts to about 40 percent of the total quantity of this material. The alkylate leaving the top of the preflash drum passes through conduit 211 and condenser 213 into a reflux accumulator 217. A vent 219 is provided for the removal of any uncondensed materials. Liquid withdrawn from accumulator 217 passes through pump 221 and is divided into two streams, with a portion being returned to the preflash drum through conduit 215 as reflux and the remainder being yielded as light alklyate portion through conduit 223. The heat required to accomplish the preceding operation is supplied by reducing pressure of the hot high pressure liquid from the debutanizer tower 207 in the bottom of the preflash drum. Although the concentration of contaminants in the bottoms leaving this drum is increased by the separation of light alkylate, little or no decomposition takes place in this vessel. There are two reasons for this: (1) the concentration of contaminants is still very low, and (2) the temperature of the bottoms is reduced through the preflashing operation to about 225° F., which is substantially below the temperature at which decomposition begins.

The remaining alkylate, which still contains a large amount of lower boiling high octane materials, is passed from the preflash drum through conduit 227 through a preheater 228 and into the rerun tower 229. The pressure on the alkylate stream is reduced and heat is added thereto by the low pressure preheater 228 before this material enters the rerun tower which operates under a vacuum. In this tower a fruther separation is made to concentrate the contaminants in the tower bottoms or heavy alkylate. The remaining light alkylate is removed from the top of the tower passing through conduit 231 and condenser 233 into accumulator 235. The total accumulator liquid is removed therefrom through pump 241 and conduits 243 and passes through a water coalescer 245 wherein undissolved water is removed. This material is then used to reflux the tower through conduit 249 with the net overhead being combined with the net preflash drum overhead through conduit 251. The total light alkylate is then removed from the unit through conduit 255. The rerun tower bottoms comprising a mixture of alkylate, polymers, and esters with the latter materials comprising about 0.4 percent by weight of the stream, is removed from the rerun tower by pump 257, is passed through conduit 259 and cooler 261 before leaving the unit. By volume this stream comprises about 10 percent of the material charged to the rerun tower and about 6 percent of the total debutanized alkylate. To prevent ester and polymer decomposition particularly in the bottom of the rerun tower and in reboiler 253, which supplies the heat required to separate the alkylate, the tower temperature is maintained at a very low level that is about 300° F. This is accomplished by reducing the pressure on the tower to about 5 p.s.i.a. by means of conventional vacuum producing equipment. In this specific illustration, the vacuum is produced by condensing the material separated from the heavy alkylate portion by water condenser 233. A steam ejector system which takes suction from accumulator 235 and condenser 233 through conduit 237 is used to remove any inert or uncondensed material and pump it to the atmosphere. Condensed materials are discharged from the steam ejector through conduits 239 into a sump.

In previous operations, it has been the practice to carry out the separation of light and heavy alkylate at pressures above atmospheric and at temperatures of 400° F. or higher. In such operations a substantial proportion of the ester and polymer contaminants have been decomposed with extensive fouling of rerun tower trays and reboiler tubes. By the method of this invention, which reduces the rerun tower bottom temperature to a non-fouling temperature level, it has become possible to eliminate this problem.

The following data is presented to illustrate the conditions encountered in a typical commercial application of this invention.

EXAMPLE

Flows

| | |
|---|---|
| Deisobutanizer bottoms #/hr | 44,000 |
| percent contaminants (esters) | 0.019 |
| Debutanized alkylate #/hr | 36,500 |
| percent contaminants (esters) | 0.023 |
| Rerun tower feed #/hr | 22,000 |
| percent contaminants (esters) | 0.038 |
| Preflash drum overhead #/hr | 14,500 |
| Light alkylate #/hr | 34,400 |
| Heavy alkylate #/hr | 2,100 |
| percent contaminants (esters) | 0.4 |
| Ratio of light to heavy alkylate | 16.4 |

Temperatures

| | ° F. |
|---|---|
| Deisobutanizer bottoms | 260 |
| Debutanizer bottoms | 325 |
| Preflash drum | 217 |
| Accumulator 217 | 110 |
| Rerun tower: | |
| Top | 170 |
| Bottom | 300 |
| Reflux | 105 |
| Light Alkylate | 107 |
| Heavy Alkylate | 110 |

Pressures

| | | |
|---|---|---|
| Deisobutanizer | p.s.i.g | 105 |
| Debutanizer | p.s.i.g | 85 |
| Preflash drum | p.s.i.g | 5 |
| Rerun tower | p.s.i.a | 6 |

Although the preceding mode of operation comprises a preferred embodiment of this invention, it is not intended that the scope of the invention be limited thereby but that it include other processing methods and equipment well known to those skilled in the art. As an example of an alternate method of operation, it is within the scope of this invention to by-pass the preflash drum by passing the debutanized alkylate through conduit 208 and thereby effect the entire separation of light from heavy alkylate in the rerun tower. Also it is not intended that the invention be restricted in any way by the particular alkylation process scheme disclosed, but that it be applicable in any alkylation process.

It may be difficult to obtain the desired low pressure and temperature in the rerun tower 229 by use of a condenser and steam ejector, when separating a high vapor pressure light alkylate, without an excessive loss of hydrocarbons to the ejector. In such a case the operation is assisted by introducing steam into the bottom of the rerun tower through conduit 263. This material serves to reduce the partial pressure of the alkylate and allows additional oil to vaporize under the same conditions of temperature and pressure. The amount of steam introduced may vary over a wide range depending on the vapor pressure of the alkylate produced and the decrease in oil partial pressure desired. More usually, the amount of steam introduced is between about 0.01 and about 0.2 pounds per pound of total alkylate yield.

Having thus described the invention by reference to a specific application thereof, it is understood that no undue limitations or restrictions are to be imposed by reason thereof but that the scope of the invention is defined by the appended claims.

We claim:

1. In a process for recovering an alkylate product from the alkylation of a mixture comprising isoparaffins, normal paraffins and olefins in the presence of sulfuric acid in which the alkylate product contains a small portion of polymers and sulfate esters which are readily decomposed during fractionation, and wherein the process comprises separating the acid and a major portion of the ester and polymer contaminants from the alkylate product mixture, distilling the alkylate mixture under superatmospheric pressure to remove substantially all of said isoparaffin, distilling the resulting alkylate product mixture under superatmospheric pressure to remove substantially all of said normal paraffin, not required for volatility in the product, and fractionating the resulting alkylate product into light and heavy alkylate fractions; the method for preventing fouling during said fractionation which comprises reducing the pressure on the alkylate after removal of said normal paraffin and prior to said fractionation to between about 1 and about 14 p.s.i.a. and fractionating said alkylate under subatmospheric pressure to provide a low boiling alkylate fraction and a high boiling alkylate fraction.

2. In a process for recovering an alkylate product from the alkylation of a mixture comprising isoparaffins, normal paraffins and olefins in the presence of sulfuric acid in which the alkylate product contains a small portion of polymers and sulfate esters which are readily decomposed during fractionation, and wherein the process comprises separating the acid and esters from the alkylate product mixture by settling, removing a major portion of the remaining ester and polymer contaminants from the alkylate product mixture, distilling the alkylate mixture under superatmospheric pressure to remove substantially all of said isoparaffin, recycling the isoparaffin thus removed to the alkylation zone, distilling the resulting alkylate product mixture under superatsmospheric pressure to remove substantially all of said normal paraffin, not required for volatility in the product, and fractionating the resulting alkylate product into light and heavy alkylate fractions; the method for preventing fouling during said fractionation which comprises reducing the pressure on the alkylate after the removal of said normal paraffin and prior to said fractionation to between about 1 and about 14 p.s.i.a. and fractionating said alkylate under subatmospheric pressure to provide a low boiling alkylate fraction and a high boiling alkylate fraction, and separately recovering the fractions thus produced.

3. The process of claim 2 wherein the initial reaction mixture comprises normal butane, isobutane and butylene.

4. The process of claim 2 wherein the temperature during fractionation is not in excess of between 260° F. and 320° F.

5. In a process for recovering an alkylate product from the alkylation of a mixture comprising isoparaffins, normal paraffins and olefins in the presence of sulfuric acid in which the alkylate product contains a small portion of polymers and sulfate esters which are readily decomposed during fractionation, and wherein the process comprises separating the acid and a major portion of the ester and polymer contaminants from the alkylate product mixture, distilling the alkylate mixture under superatmospheric pressure to remove substantially all of said isoparaffin, distilling the resulting alkylate product mixture under superatmospheric pressure to remove substantially all of said normal paraffin, not required for volatility in the product, and fractionating the resulting alkylate product into light and heavy alkylate fractions; the method for preventing fouling during fractionation which comprises reducing the pressure on the alkylate to between about 1 and about 14 p.s.i.g. by means of a flashing zone after the removal of said normal paraffin and prior to said fractionation and then fractionating said alkylate under a pressure of between about 1 and about 14 p.s.i.a. to provide a low boiling alkylate fraction and a high boiling alkylate fraction.

6. In a process for recovering an alkylate product from the alkylation of a mixture comprising isoparaffins, normal paraffins and olefins in the presence of sulfuric acid in which the alkylate product contains a small portion of polymers and sulfate esters which are readily decomposed during fractionation, and wherein the process comprises separating the acid and esters from the alkylate product mixture by settling; removing a major portion of the remaining ester and polymer contaminants from the alkylate product mixture; distilling the alkylate mixture under superatmospheric pressure to remove substantially all of said isoparaffin; recycling the isoparaffin thus removed to the alkylation zone; distilling the resulting alkylate product mixture under superatmospheric pressure to remove substantially all of said normal paraffin, not required for volatility in the product; and fractionating the resulting alkylate product into light and heavy alkylate fractions; the method for preventing fouling during fractionation which comprises reducing the pressure on the alkylate product to between about 1 and about 14 p.s.i.g. by flashing the alkylate product after removal of said normal paraffin and prior to said fractionation to produce a high boiling alkylate bottoms fraction and a low boiling alkylate fraction; withdrawing the low boiling alkylate from the flashing zone; passing the high boiling alkylate bottoms fraction from the flashing zone to a fractionation zone and fractionating said alkylate under subatmospheric pressure and at a maximum temperature of between 260° and 320° F. to provide additional low boiling alkylate and a high boiling alkylate fraction; combining the low boiling alkylate fractions; and separately recovering the combined low boiling alkylate fraction and the high boiling alkylate fraction.

7. In a process for recovering an alkylate product from the alkylation of a mixture comprising isobutane, normal butane and olefins in the presence of sulfuric acid in which the alkylate product contains a small portion of polymers and sulfate esters which are readily decomposed during fractionation and wherein the process comprises separating the acid and esters from the alkylate product mixture by settling; separating a major portion of the remaining ester and polymer contaminants from the alkylate product mixture; distilling the alkylate mixture under superatmospheric pressure to remove substantially all of the isobutane; recycling said isobutane to the alkylation zone; distilling the deisobutanized alkylate product mixture under superatmospheric pressure to remove substantially all of the normal butane, not required for volatility in the product; and fractionating the resulting alkylate product into light and heavy alkylate fractions; the method for preventing fouling during said fractionation which comprises flashing the debutanized alkylate after removal of normal butane and prior to said fractionation under a pressure below that employed for the removal of normal butane to produce a low boiling alkylate fraction and a high boiling alkylate bottoms fraction; withdrawing the low boiling alkylate fraction from the flashing zone; passing the high boiling alkylate bottoms fraction to a fractionation zone; fractionating the high boiling alkylate fraction under subatmospheric pressure between about 1 and about 14 p.s.i.a., at a temperature not in excess of between 260° and 320° F., which temperature is maintained by means of an external reboiler, to provide a fraction of additional low boiling alkylate and a high boiling alkylate fraction; combining said low boiling alkylate fractions; and separately recovering a combined low boiling alkylate fraction and a high boiling alkylate fraction.

8. In a process for recovering an alkylate product from the alkylation of a mixture comprising isobutane, normal butane and butylene in the presence of sulfuric acid in which the alkylate product contains a small portion of polymers and esters which are readily decomposed during fractionation, and wherein the process comprises separating the acid and esters from the alkylate product mixture by settling; separating a major portion of the ester and polymer contaminants remaining in the alkylate product mixture; distilling the alkylate mixture under superatmospheric pressure to remove substantially all of the isobutane; recycling said isobutane to said alkylation zone; distilling the deisobutanized alkylate product mixture under superatmospheric pressure to remove substantially all of the normal butane, not required for volatility in the product; and fractionating the resulting alkylate product into light and heavy alkylate fractions; the method for preventing fouling during said fractionation which comprises, after removal of normal butane prior to said fractionation, adjusting the temperature of the debutanized alkylate to a temperature not in excess of between 260° and 320° F.; flashing the debutanized alkylate under a pressure below that at which normal butane is removed to produce a low boiling alkylate fraction and a high boiling alkylate fraction; withdrawing the low boiling alkylate fraction from the flashing zone; passing the high boiling alkylate fraction as bottoms from the flashing zone to a fractionation zone; fractionating said high boiling alkylate bottoms fraction, under subatmospheric pressure between about 1 and about 14 p.s.i.a., at a temperature not in excess of between 260° and 320° F., which temperature is maintained by means of an external reboiler to produce a fraction of additional low boiling alkylate and a high boiling alkylate fraction; combining said low boiling alkylate fractions; and separately recovering a combined low boiling alkylate fraction and a high boiling alkylate fraction.

9. In a process for recovering an alkylate product from the alkylation of a mixture comprising isobutane, normal butane and butylene in the presence of sulfuric acid in which the alkylate product contains a small portion of polymers and esters which are readily decomposed during fractionation, and wherein the process comprises separating the acid and esters from the alkylate product mixture by settling; separating a major portion of the remaining ester and polymer contaminants from the alkylate product mixture; distilling the alkylate mixture under superatmospheric pressure to remove substantially all of the isobutane; recycling said isobutane to said alkylation zone; distilling the deisobutanized alkylate product mixture under superatmospheric pressure to remove substantially all of the normal butane, not required for volatility in the product; and fractionating the resulting alkylate product into light and heavy alkylate fractions; the method for preventing fouling during fractionation which comprises, after removal of normal butane and prior to said fractionation, flashing the debutanized alkylate to lower the pressure on the debutanized alkylate and to produce a low boiling and a high boiling alkylate fraction; withdrawing overhead the low boiling alkylate fraction from the flashing zone; adjusting the temperature of the high boiling alkylate bottoms fraction to a temperature not in excess of between 260° and 320° F.; withdrawing the high boiling bottoms fraction from the flashing zone; passing the high boiling alkylate bottoms fraction to a fractionation zone and fractionating under subatmospheric pressure between about 5 and about 10 p.s.i.a., at a temperature not in excess of between 260° and 320° F., to provide a fraction of additional low boiling alkylate and a high boiling alkylate fraction; maintaining the temperature in the fractionation zone by means of an external reboiler; combining said low boiling alkylate fractions; and separately recovering a combined low boiling alkylate fraction and a high boiling alkylate fraction as products of the process.

10. In a process for recovering an alkylate product from the liquid phase alkylation of a mixture comprising isobutane, normal butane and butylene in the presence of sulfuric acid at a temperature between about 0° and about 100° F., under a pressure ranging from atmospheric to 100 p.s.i.g., in which the alkylate product mixture contains a minor portion of sulfate ester and low boiling polymers which are readily decomposed during fractionation, and wherein the process comprises separating the acid and esters from the alkylate product mixture by settling; separating a major portion of the remaining ester and polymer contaminants from the alkylate product mixture by caustic and water washings until the concentration of ester is reduced to between about 0.001 and 0.1 percent by weight; distilling the alkylate product mixture under superatmospheric pressure to remove substantially all of the isobutane; recycling said isobutane to the alkylation zone; distilling the deisobutanized alkylate product mixture under superatmospheric pressure to remove substantially all of the normal butane, not required for volatility in the product; and fractionating the resulting alkylate product into light and heavy alkylate fractions; the method for preventing fouling during said fractionation which comprises after removal of normal butane and prior to said fractionation adjusting the temperature of the debutanized alkylate to a temperature not in excess of between 260° and 320° F.; flashing the debutanized alkylate under atmospheric pressure to produce a low boiling and a high boiling fraction; withdrawing the low boiling alkylate fraction from the flashing zone; passing the high boiling alkylate fraction as bottoms from the flashing zone to a fractionation zone, and fractionating under subatmospheric pressure between about 5 and about 10 p.s.i.a., at a temperature not in excess of between 260° and 320° F., which temperature is maintained by means of an external reboiler, to provide a fraction of additional low boiling alkylate and a high boiling alkylate fraction; combining said low boiling alkylate fractions and separately recovering the combined low boiling alkylate fraction and the high boiling alkylate fraction as products of the process.

11. In a sulfuric acid alkylation process wherein an isoparaffin is reacted with an olefin to produce an alkylate effluent; the sulfuric acid contaminants are removed from the alkylate effluent to produce an alkylate effluent which meets commercial specifications with respect to sulfur content; and wherein the isoparaffin reactant and normal paraffin diluent is removed from the alkylate effluent under superatmospheric pressure, the improved method for separating said deparaffinized alkylate effluent into fractions having different boiling points which comprises: fractionating said normal and isoparaffin free alkylate effluent into fractions at a pressure of between about 1 and about 14 p.s.i.g. in a fractionation zone wherein the temperature does not exceed 320° F.

References Cited in the file of this patent
UNITED STATES PATENTS

| | | |
|---|---|---|
| 2,039,798 | Ipatieff | May 5, 1936 |
| 2,393,154 | Franklin | Jan. 15, 1946 |
| 2,435,708 | Byrns | Feb. 10, 1948 |
| 2,570,607 | Smith | Oct. 9, 1951 |
| 2,636,055 | Jones | Apr. 21, 1953 |

OTHER REFERENCES

Weber: The Oil and Gas Journal, vol. 49, No. 34, pp. 78 and 80, December 1950.